United States Patent [19]

Matsuba et al.

[11] 4,152,710
[45] May 1, 1979

[54] INK LIQUID SUPPLY SYSTEM FOR AN INK JET SYSTEM PRINTER

[75] Inventors: Masaharu Matsuba; Kiyoshi Sugiyama, both of Yokosuka; Hiromitsu Nakagawa, Mishima; Hisashi Yoshimura, Yamatokoriyama, all of Japan

[73] Assignees: Nippon Telegraph & Telephone Public Corporation, Tokyo; Sharp Kabushiki Kaisha, Osaka, both of Japan

[21] Appl. No.: 840,035

[22] Filed: Oct. 6, 1977

[51] Int. Cl.² ............................................. G01D 15/18
[52] U.S. Cl. ................................... 346/140 R; 346/75
[58] Field of Search ............................. 346/75, 140 R

[56] References Cited

U.S. PATENT DOCUMENTS

| | | |
|---|---|---|
| 3,296,624 | 1/1967 | Ascoli ............................. 346/140 R |
| 3,708,798 | 1/1973 | Hildenbrand et al. ........... 346/140 R |
| 3,929,071 | 12/1975 | Cialone et al. ................. 346/140 R X |
| 3,974,508 | 8/1976 | Blumenthal ..................... 346/140 R |
| 4,007,684 | 2/1977 | Takano et al. ................. 346/140 R X |
| 4,042,937 | 8/1977 | Perry et al. ................... 346/140 R X |

Primary Examiner—George H. Miller, Jr.
Attorney, Agent, or Firm—Birch, Stewart, Kolasch & Birch

[57] ABSTRACT

An electromagnetic cross valve is provided for selectively connecting a nozzle with an ink liquid supply conduit and an ink liquid drain conduit. When the nozzle is connected with the ink liquid drain conduit, ink liquid remains in the nozzle in such a manner that the ink liquid is filled to the tip end of the nozzle or the orifice of the nozzle.

9 Claims, 2 Drawing Figures

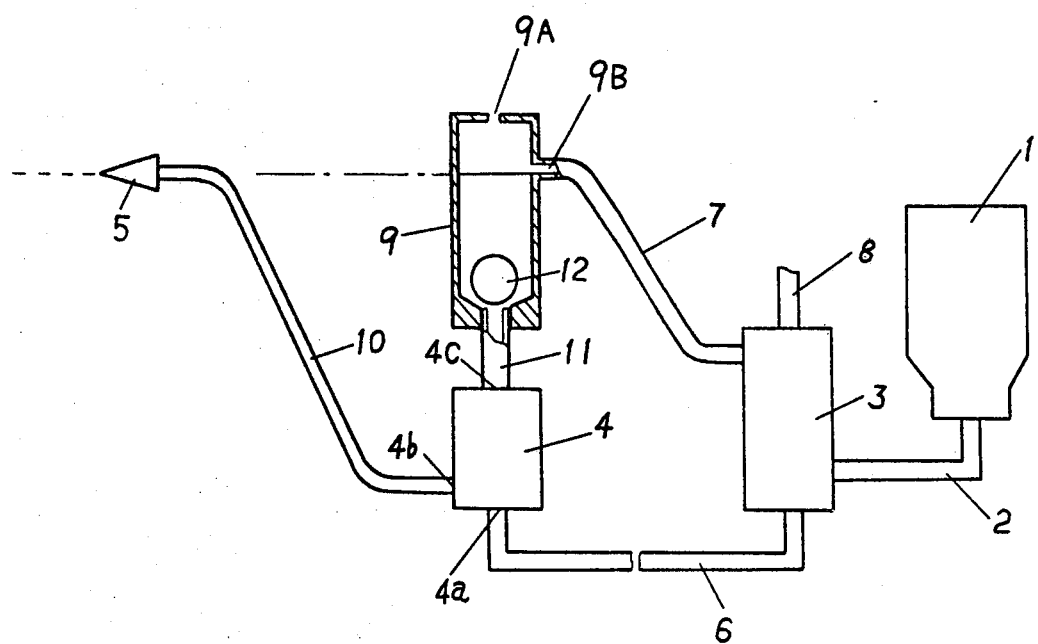
FIG. I
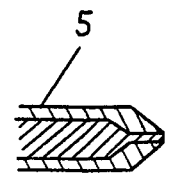
FIG. 2

INK LIQUID SUPPLY SYSTEM FOR AN INK JET SYSTEM PRINTER

BACKGROUND OF THE INVENTION

1. Field of the Invention

The present invention relates to an ink liquid supply system for an ink jet system printer.

2. Description of the Prior Art

Generally, in an ink jet system printer and, more specifically, in an ink jet system printer of the charge amplitude controlling type, ink liquid is sent from an ink liquid reservoir to a nozzle under a predetermined pressure when a print operation is performed. When the ink jet system printer ceases its operation, the ink liquid supply from the ink liquid reservoir to the nozzle is terminated.

In a system wherein the issuance of the ink liquid from the nozzle is gradually reduced when the ink jet system printer ceases its operation, there is a possibility that the ink liquid will drip from the tip end of the nozzle. This will cause the system to operate erroneously or break down, since the insulation of the system can not be maintained.

Accordingly, it is required that the issuance of the ink liquid from the nozzle will be suddenly terminated when the ink jet system printer ceases its operation. A typical system to perform sudden termination of the ink issuance from the nozzle is disclosed in U.S. Pat. Np. 4,007,684 "INK LIQUID WARMER FOR INK JET SYSTEM PRINTER" issued on Feb. 15, 1977, wherein an electromagnetic cross valve is provided for controlling the supply direction of the ink liquid. When the ink jet system printer ceases its operation, negative pressure is created at the nozzle by the electromagnetic cross valve to return the ink liquid from the nozzle.

In the above-mentioned type of ink liquid supply system, the ink liquid surface comes into contact with the air at the interior of the nozzle when the ink jet system printer is not performing a print operation. Therefore, there is a possibility that the ink liquid will solidify within the nozzle. This will block the orifice of the nozzle when the ink jet system printer begins to operate after interruption of print operation for a considerably long period of time.

OBJECTS AND SUMMARY OF THE INVENTION

Accordingly, an object of the present invention is to provide an ink liquid supply system for an ink jet system printer.

Another object of the present invention is to suddenly terminate the issuance of ink liquid from a nozzle when an ink jet system printer ceases its operation.

Still another object of the present invention is to provide an ink liquid supply system for an ink jet system printer, wherein ink liquid is filled to the tip end of the nozzle when an ink jet system printer ceases its operation.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electromagnetic cross valve is provided for selectively connecting a nozzle with an ink liquid supply conduit and an ink liquid drain conduit. The electromagnetic cross valve functions to supply ink liquid from an ink liquid reservoir to the nozzle via the ink liquid supply conduit when the ink jet system printer performs a printing operation. When the ink jet system printer ceases its operation, the electromagnetic cross valve functions to connect the nozzle with the ink liquid drain conduit, whereby the issuance of the ink liquid from the nozzle is suddenly terminated.

A tank is disposed within the ink liquid drain system. The tank has an opening for maintaining the internal pressure of the tank at atmospheric pressure and an outlet connected with the ink liquid reservoir. The outlet of the tank is held at the height identical with that of the tip end of the nozzle, whereby the ink liquid is filled to the tip end of the nozzle when the ink jet system printer ceases its operation.

In a preferred form, shock absorbing means are disposed within the tank in order to prevent the ejection of the ink liquid from the opening when the nozzle is connected with the ink liquid drain conduit via the electromagnetic cross valve.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a schematic block diagram of an embodiment of an ink liquid supply system of the present invention; and FIG. 2 is a sectional view of the tip of a nozzle for explaining operation of the ink liquid supply system of FIG. 1.

DESCRIPTION OF THE PREFERRED EMBODIMENTS

FIG. 1 shows an embodiment of an ink liquid supply system for an ink jet system printer of the present invention.

An ink liquid cartridge 1 is communicated to an ink liquid reservoir 3 through a conduit 2 in order to maintain the ink liquid level in the ink liquid reservoir 3 at a predetermined value.

The ink liquid reservoir 3 is connected to an electromagnetic cross valve 4 via an ink liquid supply conduit 6. The ink liquid is supplied to a nozzle 5 through the electromagnetic cross valve 4 when the ink jet system printer is placed in the operative condition. A pump, an air chamber, filter and an air trap are disposed within the ink liquid supply system as described in U.S. Pat. No. 4,007,684 entitled "INK LIQUID WARMER FOR INK JET SYSTEM PRINTER".

The ink liquid reservoir 3 has two other inlets. One is connected to an ink liquid drain conduit 7 for returning the ink liquid from the nozzle 5 through the electromagnetic cross valve 4, the other is connected to a recirculation conduit 8 for recirculating the waste ink liquid from a beam gutter to the ink liquid reservoir 3.

The electromagnetic cross valve 4 has three openings $4_a$, $4_b$ and $4_c$. The opening $4_a$ is connected with the ink liquid reservoir 3 through the ink liquid supply conduit 6, the opening $4_b$ is connected with the nozzle 5 through a flexible conduit 10, and the opening $4_c$ is connected with the ink liquid drain conduit 7 via a tank 9 and a conduit 11.

When the opening $4_c$ is closed and the openings $4_a$ and $4_b$ are communicated to each other within the electromagnetic cross valve 4, the ink liquid is sent from the ink liquid reservoir 3 to the nozzle 5. Conversely, when the opening $4_a$ is closed and the openings $4_b$ and $4_c$ are communicated to each other within the electromagnetic cross valve 4, the ink liquid is returned from the nozzle 5 toward the ink liquid reservoir 3 through the ink liquid drain conduit 7. That is, the electromagnetic cross valve 4 functions to control the flow direction of the ink liquid, or, the issuance of the ink liquid from the nozzle 5.

The tank 9 has an opening $9_A$ in the upper wall thereof for maintaining the internal pressure of the tank 9 at atmospheric pressure, an inlet in the bottom wall thereof, the inlet being connected to the opening $4_c$ of the electromagnetic cross valve 4 through the conduit 11, and an outlet $9_B$ in the upper section of the side wall thereof, the outlet $9_B$ being connected to the ink liquid reservoir 3 through the ink liquid drain conduit 7.

The tank 9 is held in the system in such a manner that the outlet $9_B$ is maintained at a height substantially identical with that of the nozzle 5. The diameter of the flexible conduit 10 for connecting the electromagnetic cross valve 4 with the nozzle 5 is smaller than that of the conduit 11 for connecting the electromagnetic cross valve 4 with the tank 9. A ball valve 12 is disposed within the tank 9 so as to confront the inlet of the tank 9.

When the ink jet system printer performs a printing operation, the openings $4_a$ and $4_b$ are communicated to each other within the electromagnetic cross valve 4, whereby the ink liquid is emitted from the nozzle 5. At this moment the opening $4_c$ of the electromagnetic cross valve 4 is closed. The ink liquid contained within the ink liquid reservoir 3 is sent to the nozzle 5 under a predetermined pressure through the pump, the ink liquid supply conduit 6 and the flexible conduit 10.

When the printing operation is terminated, the opening $4_a$ of the electromagnetic cross valve 4 is closed, and the openings $4_b$ and $4_c$ are communicated to each other within the electromagnetic cross valve 4. The ink pressure applied to the nozzle 5 is absorbed by the tank 9. The reduction of the ink pressure is terminated when the ink liquid pressure becomes identical with atmospheric pressure.

In this way, the nozzle 5 and the tank 9 are communicated to each other, whereby ink pressure is suddenly reduced to the atmospheric pressure. Therefore, the issuance of the ink liquid from the nozzle 5 is suddenly terminated. The sudden reduction of the ink liquid pressure is secured since the diameter of the conduit 11 is greater than that of the flexible conduit 10.

At the time when the electromagnetic cross valve 4 is changing its state, there is a possibility that the openings $4_a$ and $4_c$ are communicated to each other within the electromagnetic cross valve 4. The high pressure ink liquid is introduced into the tank 9 via the conduit 11. At this moment, the ball valve 12 functions to absorb the rapid flow of the ink liquid, thereby preventing the ejection of the ink liquid from the opening $9_A$. Superfluous ink liquid introduced into the tank 9 is sent to the ink liquid reservoir 3 through the outlet $9_B$. Since the outlet $9_B$ is held at a height identical with that of the nozzle 5, the ink liquid is filled to the tip end of the nozzle 5 as shown in FIG. 2.

There is a possibility that the ink liquid will solidify at the tip end of the nozzle 5 when the printing operation is not conducted for a considerably long period of time. The solidified ink can easily be removed when the ink liquid is supplied from the ink liquid reservoir 3 to the nozzle 5 under a predetermined pressure.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an ink liquid supply system for an ink jet system printer, which comprises an ink liquid supply conduit for supplying ink liquid from an ink liquid reservoir to a nozzle, an ink liquid drain conduit for returning the ink liquid from said nozzle to said ink liquid reservoir, and a valve means for selectively connecting said nozzle with said ink liquid supply conduit and said ink liquid drain conduit, the improvement comprising:
   a tank interposed between said valve means and said ink liquid drain conduit;
   an opening formed in a wall of said tank for maintaining the internal pressure of said tank at atmospheric pressure; and
   an outlet of said tank formed in a wall of said tank, said outlet being located at a position of which the height is substantially identical with that of the tip end of said nozzle.

2. The ink liquid supply system for an ink jet system printer of claim 1, wherein said valve means is an electromagnetic cross valve having three openings connected to said ink liquid supply conduit, said nozzle, and said tank, respectively.

3. The ink liquid supply system for an ink jet system printer of claim 1, wherein said opening is formed in the upper wall of said tank.

4. The ink liquid supply system for an ink jet system printer of claim 1, wherein said outlet of said tank is formed at the upper portion of the side wall of said tank.

5. The ink liquid supply system for an ink jet system printer of claim 1, wherein said tank is communicated to said valve means at the bottom wall of said tank through a conduit.

6. The ink liquid supply system for an ink jet system printer of claim 5, wherein a shock absorbing means is provided near a connection point of said tank and said conduit for communicating said tank to said valve means.

7. The ink liquid supply system for an ink jet system printer of claim 6, wherein said shock absorbing means is a ball valve disposed at said bottom wall of said tank.

8. The ink liquid supply system for an ink jet system printer of claim 5, wherein said valve means is an electromagnetic cross valve having three openings connected to said ink liquid supply conduit, said nozzle via a flexible conduit, and said conduit for communicating said bottom wall of said tank to said valve means, respectively.

9. The ink liquid supply system for an ink jet system printer of claim 8, wherein the diameter of said flexible conduit is smaller than that of said conduit for communicating said bottom wall of said tank to said electromagnetic cross valve.

* * * * *